(12) United States Patent
Hoover et al.

(10) Patent No.: US 10,940,949 B2
(45) Date of Patent: Mar. 9, 2021

(54) SHORT MULTIPLE FUNCTION ROTARY ACTUATOR LEVER

(71) Applicant: AMI Industries, Inc., Colorado Springs, CO (US)

(72) Inventors: Douglas E. Hoover, Colorado Springs, CO (US); Kyle David Doughty, Colorado Springs, CO (US)

(73) Assignee: AMI INDUSTRIES, INC., Colorado Springs, CO (US)

(*) Notice: Subject to any disclaimer, the term of this patent is extended or adjusted under 35 U.S.C. 154(b) by 82 days.

(21) Appl. No.: 16/388,497

(22) Filed: Apr. 18, 2019

(65) Prior Publication Data

US 2020/0331612 A1    Oct. 22, 2020

(51) Int. Cl.
*B64D 11/06*    (2006.01)
*B60N 2/02*    (2006.01)

(52) U.S. Cl.
CPC .......... *B64D 11/064* (2014.12); *B60N 2/0296* (2013.01)

(58) Field of Classification Search
CPC .............. B64D 11/064; B64D 11/0639; B64D 11/0696; B60N 2/0296; B60N 2/02; B60N 2/0292; B60N 2/0875; F16H 37/14; F16H 21/02
USPC .......................................... 297/463.1, 344.1
See application file for complete search history.

(56) References Cited

U.S. PATENT DOCUMENTS

| 2,453,869 A | 11/1948 | Slate | |
| 2,660,383 A | 11/1953 | Feeney et al. | |
| 2,669,284 A * | 2/1954 | Pall | B64D 11/064 297/344.14 |
| 2,892,358 A * | 6/1959 | Backus | F16H 37/00 74/473.1 |
| 3,188,044 A * | 6/1965 | Epple | B60N 2/0296 248/419 |
| 3,301,084 A * | 1/1967 | Boda | B63H 21/213 477/113 |
| 3,537,328 A * | 11/1970 | Allen | B60K 26/00 74/481 |

(Continued)

FOREIGN PATENT DOCUMENTS

| GB | 559817 | 3/1944 |
| JP | 2009261285 | 11/2009 |
| KR | 20090072204 | 7/2009 |

OTHER PUBLICATIONS

European Patent Office, European Search Report dated Jul. 16, 2020 in Application No. 19213468.2.

*Primary Examiner* — Mark R Wendell
(74) *Attorney, Agent, or Firm* — Snell & Wilmer LLP

(57) ABSTRACT

A multi-function lever actuation system includes a control lever having a neutral position and configured to be actuated in a clockwise direction and in a counterclockwise direction. The system further includes a bell crank coupled to the control lever and configured to rotate in an opposite direction from the control lever and to actuate a first controlled component in response to a first rotation of the control lever in a first direction corresponding to the clockwise direction or the counterclockwise direction. The system further includes a first cable coupled to the control lever and configured to actuate a second controlled component in response to a rotation of the control lever in a second direction corresponding to the other of the clockwise direction or the counterclockwise direction.

18 Claims, 7 Drawing Sheets

(56) References Cited

U.S. PATENT DOCUMENTS

| | | | |
|---|---|---|---|
| 5,197,780 A | 3/1993 | Coughlin | |
| 6,116,695 A * | 9/2000 | Heidmann | A47C 1/023 |
| | | | 297/285 |
| 6,139,104 A | 10/2000 | Brewer | |
| 7,866,751 B2 | 1/2011 | Downey | |
| 9,290,272 B1 * | 3/2016 | Hoover | B64D 11/0639 |
| 9,725,176 B2 * | 8/2017 | Ferguson | B60N 2/0296 |
| 9,758,059 B2 * | 9/2017 | Ferguson | F16K 31/52 |
| 9,908,441 B2 * | 3/2018 | Ferguson | H02K 7/06 |
| 10,011,197 B2 * | 7/2018 | Ferguson | F16H 21/02 |
| 2009/0026791 A1 * | 1/2009 | Ishijima | B60N 2/167 |
| | | | 296/65.18 |
| 2009/0026825 A1 * | 1/2009 | Ishijima | B60N 2/1615 |
| | | | 297/358 |
| 2014/0077553 A1 * | 3/2014 | Battey | A47C 31/023 |
| | | | 297/301.4 |
| 2017/0050734 A1 | 2/2017 | Becker et al. | |

\* cited by examiner

SHORT MULTIPLE FUNCTION ROTARY
ACTUATOR LEVER

FIELD

The present disclosure relates to mechanical control mechanisms for controlling a seat assembly and, more particularly, to a mechanical control system for facilitating multiple-function control of a seat assembly using a single control lever.

BACKGROUND

Current seat assemblies may include various control mechanisms for controlling operation of various components of the seat assembly. For example, a first lever may be used to control actuation of a seat back and a second, separate lever or button may be used to control actuation of a leg rest. Such a system may be undesirable for various reasons. For example, it may be undesirable to have multiple control mechanisms (such as levers or button) as they may increase complexity of the seat assembly and may increase a total cost of the seat assembly due to the multiple components utilized therein. Additionally, this type of system includes multiple components that may each be susceptible to damage, potentially resulting in multiple repairs or replacements.

SUMMARY

Disclosed herein is a multi-function lever actuation system. The system includes a control lever having a neutral position and configured to be actuated in a clockwise direction and in a counterclockwise direction. The system further includes a bell crank coupled to the control lever and configured to rotate in an opposite direction from the control lever and to actuate a first controlled component in response to a first rotation of the control lever in a first direction corresponding to the clockwise direction or the counterclockwise direction. The system further includes a first cable coupled to the control lever and configured to actuate a second controlled component in response to a rotation of the control lever in a second direction corresponding to the other of the clockwise direction or the counterclockwise direction.

In any of the foregoing embodiments, the control lever defines a first lost motion slot and the first cable is coupled to the control lever via being received by the first lost motion slot such that the first rotation of the control lever in the first direction fails to actuate the first cable.

Any of the foregoing embodiments may further include a second cable coupled to the control lever and configured to actuate a third controlled component in response to a second rotation of the control lever in the first direction that is greater than the first rotation.

In any of the foregoing embodiments, the first controlled component and the third controlled component are both coupled to a first actuated system such that actuation of the first controlled component unlocks the first actuated system and actuation of the third controlled component facilitates actuation of the first actuated system.

In any of the foregoing embodiments, the first actuated system is a seat recline system of a seat assembly such that the second rotation of the control lever in the first direction actuates the seat recline system, and the second controlled component is coupled to a second actuated system that corresponds to a leg rest system of the seat assembly such that the rotation of the control lever in the second direction actuates the leg rest system.

Any of the foregoing embodiments may further include a rotary component coupled to the control lever and configured to rotate with the control lever, wherein the second cable is coupled to the control lever via the rotary component.

In any of the foregoing embodiments, the rotary component defines a second lost motion slot and the second cable is coupled to the rotary component via being received by the second lost motion slot such that the rotation of the control lever in the second direction fails to actuate the second cable.

In any of the foregoing embodiments, the rotary component is coupled to the bell crank at a fulcrum such that the bell crank rotates in the opposite direction from the rotary component and the control lever.

Any of the foregoing embodiments may further include a static component configured to be in contact with the rotary component in response to the control lever being in the neutral position, and a spring coupled to the static component and configured to resist the rotation of the rotary component in the second direction in order to cause the control lever to return to the neutral position in response to a release of pressure to the control lever.

Also disclosed is a multi-function lever actuation system. The system includes a control lever having a neutral position and configured to be actuated in a clockwise direction and in a counterclockwise direction. The system further includes a rotary component coupled to the control lever and configured to actuate a first controlled component in response to a first rotation of the control lever in a first direction corresponding to the clockwise direction or the counterclockwise direction. The system further includes a first cable coupled to the control lever and configured to actuate a second controlled component in response to a rotation of the control lever in a second direction corresponding to the other of the clockwise direction or the counterclockwise direction.

In any of the foregoing embodiments, the control lever defines a first lost motion slot and the first cable is coupled to the control lever via being received by the first lost motion slot such that the first rotation of the control lever in the first direction fails to actuate the first cable.

Any of the foregoing embodiments may further include a second cable coupled to the control lever and configured to actuate a third controlled component in response to a second rotation of the control lever in the first direction that is greater than the first rotation.

In any of the foregoing embodiments, the first controlled component and the third controlled component are both coupled to a first actuated system such that actuation of the first controlled component unlocks the first actuated system and actuation of the third controlled component facilitates actuation of the first actuated system.

In any of the foregoing embodiments, the first actuated system is a seat recline system of a seat assembly such that the second rotation of the control lever in the first direction actuates the seat recline system, and the second controlled component is coupled to a second actuated system that corresponds to a leg rest system of the seat assembly such that the rotation of the control lever in the second direction actuates the leg rest system.

In any of the foregoing embodiments, the second cable is coupled to the control lever via the rotary component.

In any of the foregoing embodiments, the rotary component defines a second lost motion slot and the second cable is coupled to the rotary component via being received by the second lost motion slot such that the rotation of the control lever in the second direction fails to actuate the second cable.

Any of the foregoing embodiments may further include a bell crank coupled to the rotary component at a fulcrum such that the bell crank rotates in an opposite direction from the rotary component and the control lever, wherein the rotary component is configured to actuate the first controlled component via the rotation of the bell crank.

Any of the foregoing embodiments may further include a static component configured to be in contact with the rotary component in response to the control lever being in the neutral position, and a spring coupled to the static component and configured to resist the rotation of the rotary component in the second direction in order to cause the control lever to return to the neutral position in response to a release of pressure to the control lever.

Also disclosed is a multi-function lever actuation system. The system includes a control lever having a neutral position and configured to be actuated in a clockwise direction and in a counterclockwise direction. The system further includes a rotary component coupled to the control lever and configured to rotate with the control lever. The system further includes a bell crank coupled to the rotary component at a fulcrum and configured to rotate in an opposite direction from the control lever and the rotary component in order to actuate a first controlled component in response to a first rotation of the control lever in a first direction corresponding to the clockwise direction or the counterclockwise direction. The system further includes a first cable coupled to the control lever and configured to actuate a second controlled component in response to a rotation of the control lever in a second direction corresponding to the other of the clockwise direction or the counterclockwise direction. The system further includes a second cable coupled to the rotary component and configured to actuate a third controlled component in response to a second rotation of the control lever in the first direction that is greater than the first rotation.

In any of the foregoing embodiments, the first controlled component and the third controlled component are both coupled to a first actuated system such that actuation of the first controlled component unlocks the first actuated system and actuation of the third controlled component facilitates actuation of the first actuated system; and the second controlled component is coupled to a second actuated system such that actuation of the second controlled component facilitates actuation of the second actuated system.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
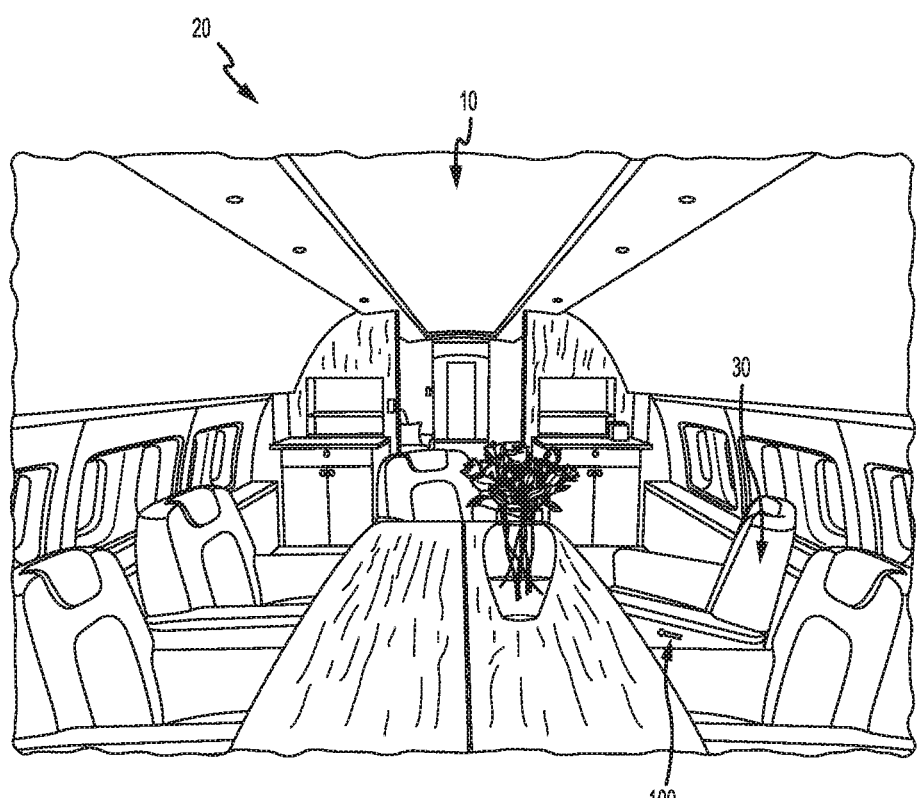
FIG. 1 illustrates an aircraft interior including multiple seat assemblies, in accordance with various embodiments.

Referring now to FIG. 1, an aircraft interior 10 of an aircraft 20 may include multiple seat assemblies 30. Each of the seat assemblies 30 may be designed for use in the aircraft 20. For example, the seat assemblies 30 may be oriented all facing forward, as with commercial aircraft, or may be oriented in different directions, as with personal or business aircraft and as shown in FIG. 1. Each of the seat assemblies 30 may further include a multi-function lever actuation system 100 (or system 100). As will be disclosed in more detail below, the multi-function lever actuation system 100 may include a control lever (element 102 of FIG. 2) which may control two or more actuated systems (such as a seat recline system and a leg rest system) of the seat assemblies 30.

Figure 2A:
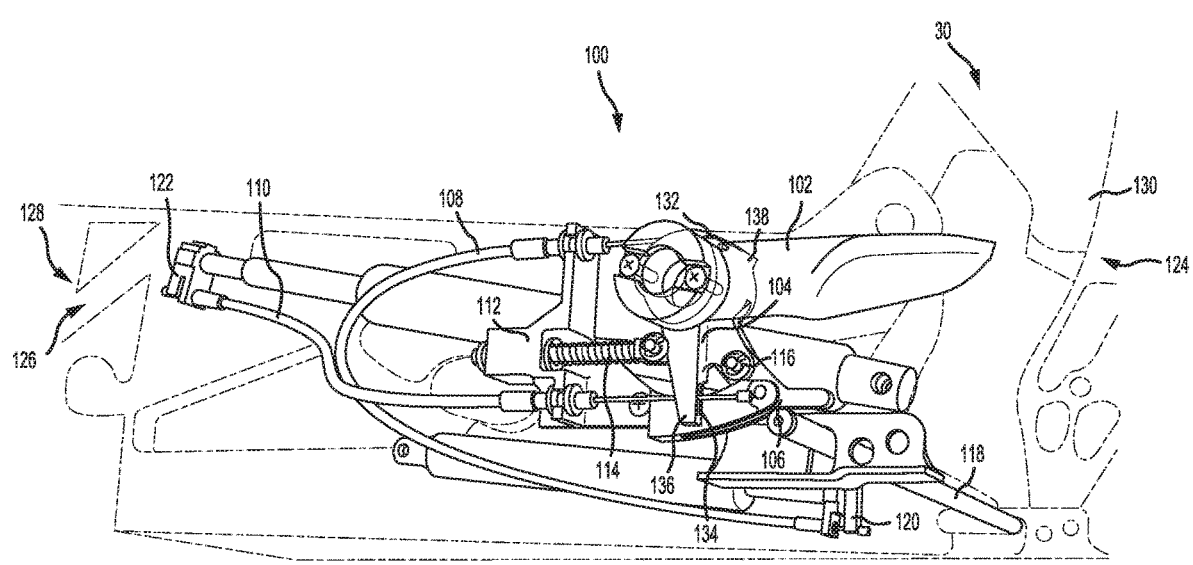
FIGS. 2A and 2B illustrate a multi-function lever actuation system in a neutral position, in accordance with various embodiments.
Figure 2B:
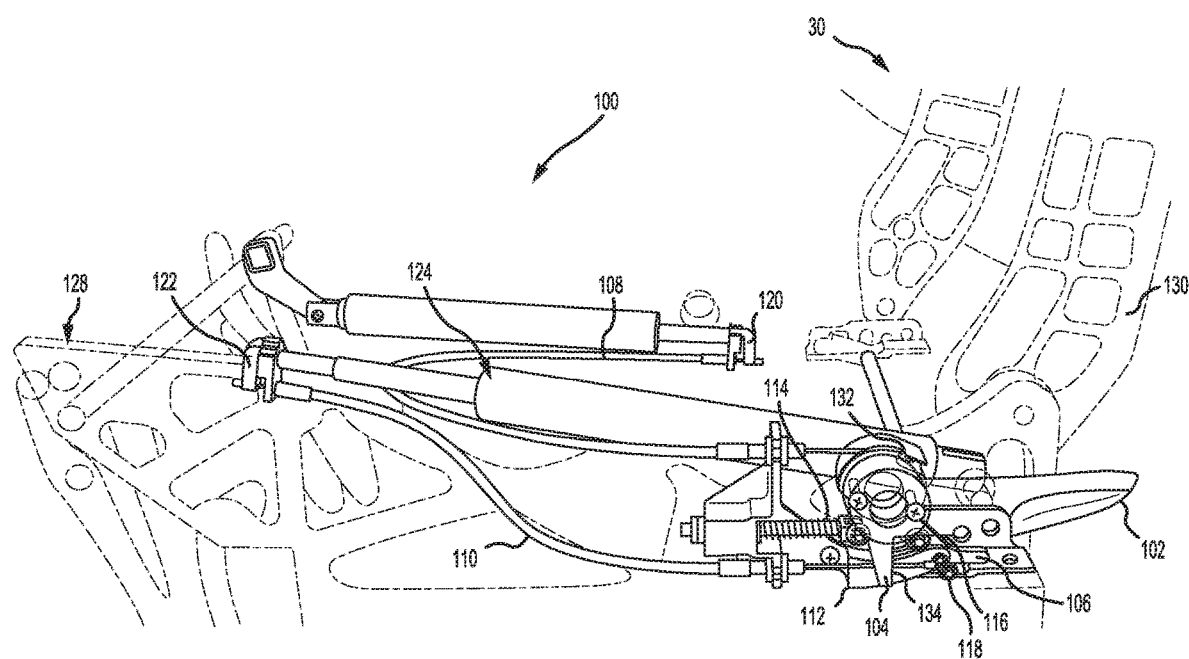

Referring now to FIGS. 2A and 2B, additional details of the multi-function lever actuation system 100 are shown. The system 100 may be included as part of the seat assembly 30 or may be provided as a separate component from the seat assembly 30. The system 100 may include a control lever 102, a rotary component 104 coupled to the control lever 102 and designed to rotate along with the control lever 102, and a bell crank 106 coupled to the rotary component 104 at a fulcrum 116 and designed to rotate in an opposite direction relative to the control lever 102 and the rotary component 104. In that regard and in response to counterclockwise rotation of the control lever 102, the rotary component 104 may likewise rotate in the counterclockwise direction and the bell crank 106 may rotate in the clockwise direction.

Likewise and in response to clockwise rotation of the control lever 102, the rotary component 104 may rotate in the clockwise direction and the bell crank 106 may rotate in the counterclockwise direction.

The system 100 may further include a first cable 108 coupled to the control lever 102 (such as via the rotary component 104) and a second cable 110 likewise coupled to the control lever 102 (such as via the rotary component 104). For example, the first cable 108 may be coupled to a top of a main body 138 located at a bottom of the rotary component 104, and the second cable 110 may be coupled to an arm 136 located at a bottom of the rotary component 104. The rotary component 104 may apply tension to the first cable 108 in response to rotation of the control lever 102 in a first direction (such as a clockwise direction) and may apply tension to the second cable 110 in response to rotation of the control lever 102 in a second direction (such as a counterclockwise direction).

The system 100 may also include a static component 112 that remains stationary relative to the control lever 102, the rotary component 104, and the bell crank 106. The system 100 may further include a spring 114 coupled to the static component 112 and designed to contact the rotary component 104 in response to the control lever 102 being in a neutral position (as shown in FIGS. 2A and 2B). The spring 114 may cause the control lever 102 to return to the neutral position in response to a lack of pressure being applied on the control lever 102.

The system 100 may be coupled to, and designed to control, a first actuated system 124 and a second actuated system 126. The first actuated system 124 may be a seat recline system designed to control operation of a seat back 130 of the seat assembly 30. The second actuated system 126 may be a leg rest system designed to control operation of a leg rest 128 of the seat assembly 30.

Figure 3A:
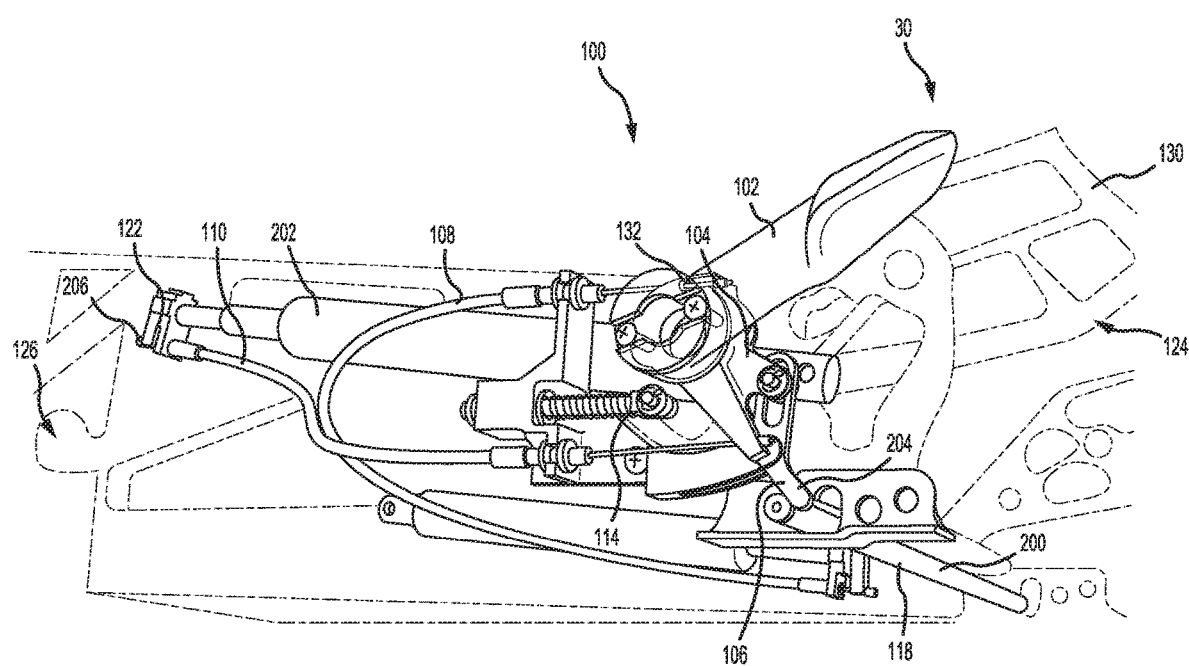
FIGS. 3A and 3B illustrate the multi-function lever actuation system of FIGS. 2A and 2B in a first actuated position, in accordance with various embodiments.

The first actuated system 124 may include a first controlled component 118, such as a recline lock (element 200 of FIG. 3A) and a third controlled component 122, such as a fluid cylinder (element 202 of FIG. 3A). In response to the recline lock and the fluid cylinder of the first actuated system 124 being actuated, the seat back 130 may be moved between an upright and a reclined position.

Figure 4A:
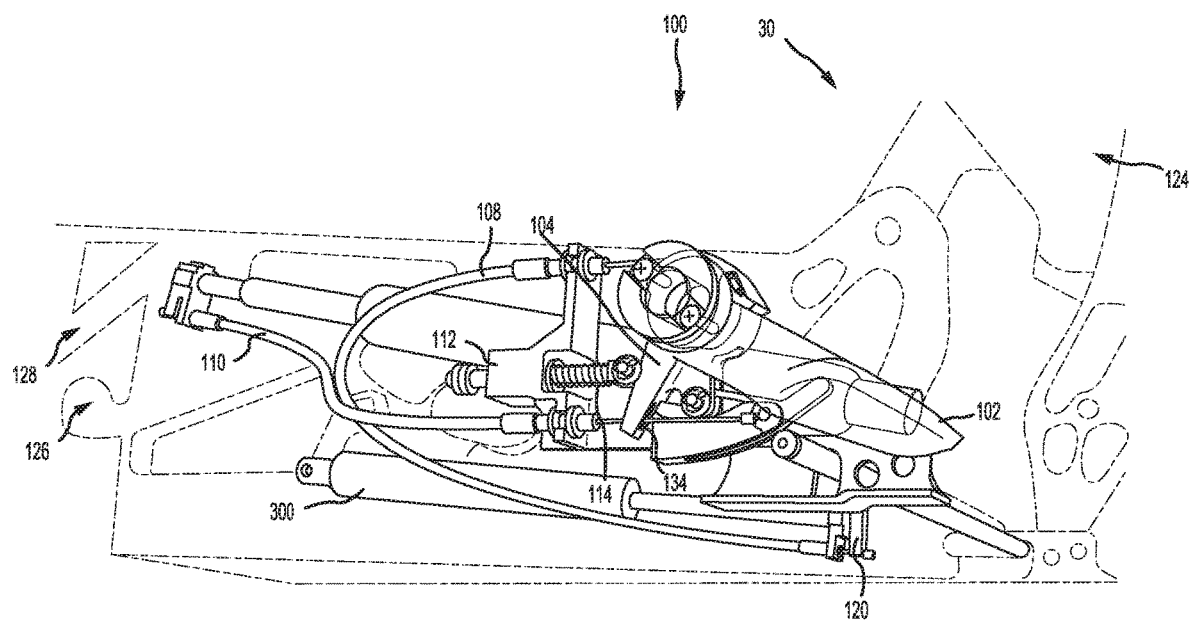
FIGS. 4A and 4B illustrate the multi-function lever actuation system of FIGS. 2A and 2B in a second actuated position, in accordance with various embodiments.

The second actuated system 126 may include a second controlled component 120, such as a fluid cylinder (element 300 of FIG. 4A). In response to the fluid cylinder of the second actuated system 126 being actuated, the leg rest 128 may be moved between a stowed position and an extended position.

The rotary component 104 may define a first lost motion slot 132 and a second lost motion slot 134. The first cable 108 may extend through the first lost motion slot 132 and the second cable 110 may extend through the second lost motion slot 134. In response to rotation of the rotary component 104 in the clockwise direction, the rotary component 104 may apply tension to the first cable 108 while the second lost motion slot 134 allows the second cable 110 to extend therethrough, failing to apply tension to the second cable 110.

Likewise, in response to rotation of the rotary component 104 in the counterclockwise direction, the rotary component 104 may apply pressure to the second cable 110 while the first lost motion slot 132 allows the first cable 108 to extend therethrough, failing to apply tension to the first cable 108.

Although the system 100 is shown as utilizing a counterclockwise rotation of the control lever 102 to control the first actuated system 124 and a clockwise rotation of the control lever 102 to control the second actuated system 126, one skilled in the art will realize that this control may be reversed without departing from the scope of the present disclosure.

Figure 3B:
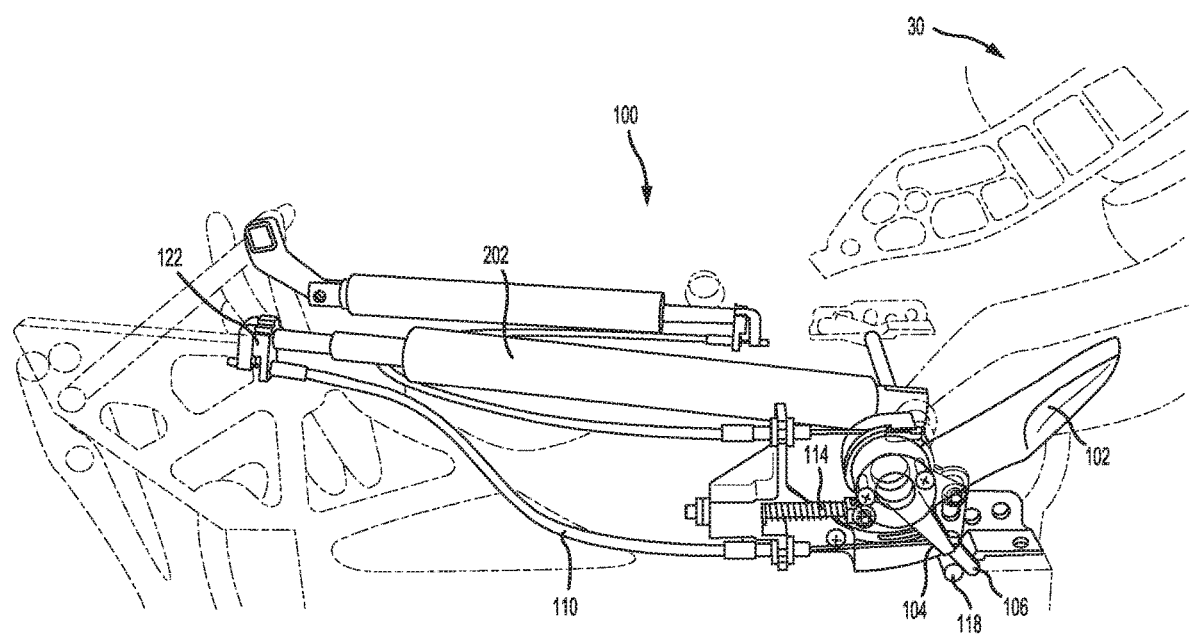

Referring now to FIGS. 3A and 3B, operation of the system 100 to control the first actuated system 124 (corresponding to operation of the seat back 130) is shown. In response to a first stage or amount of rotation of the control lever 102 in the counterclockwise direction, the rotary component 104 may likewise rotate along with the control lever 102. The bell crank 106 may rotate in the clockwise direction in response to the counterclockwise rotation of the rotary component 104.

In response to a first rotation of the bell crank 106 in the clockwise direction, the bell crank 106 may contact the first controlled component 118, thus actuating the first controlled component. For example, a control arm 204 of the bell crank 106 may apply a downward force on the first controlled component 118. As described above, the first controlled component 118 may include a recline lock 200 designed to unlock a locking mechanism corresponding to the seat back 130.

In response to a second stage or amount of rotation of the control lever 102 in the counterclockwise direction (corresponding to a continuation of the first rotation), the rotary component 104 may apply tension to the second cable 110. This tension may transfer through the second cable 110 and actuate the third controlled component 122, which may correspond to actuation of the fluid cylinder 202. For example, the second cable 110 may actuate a lever 206 that is coupled to the fluid cylinder 202, allowing the fluid cylinder 202 to receive fluid (to expand) or expel fluid (to contract). Actuation of the fluid cylinder 202 may facilitate a reclining function of the seat back 130.

Thus, rotation of the control lever 102 by a first amount unlocks the recline lock 200 and continued rotation of the control lever 102 by a second amount actuates the fluid cylinder 202, allowing the seat back 130 to be reclined. In that regard, the first actuated system 124 may be a two-stage actuated system, actuating only in response to both stages (the first controlled component 118 and the third controlled component 122) being actuated. This may be desirable for control of a seat back 130 to reduce the likelihood of the seat back 130 actuating during takeoff or landing.

In various embodiments, the first controlled component 118 may operate a separate component than the third controlled component 122. For example, the first controlled component 118 may control a seat back and the third controlled component 122 may control a seat height.

Due to the first lost motion slot 132 allowing the first cable 108 to move therethrough, rotation of the control lever 102 in the counterclockwise direction fails to affect the second actuated system 126.

In various embodiments, the spring 114 may be coupled to the rotary component 104 in such a manner that rotation of the rotary component 104 in the counterclockwise direction extends the spring 114, thus causing the spring 114 to apply a pressure to the rotary component 104. This pressure may cause the rotary component 104, and thus the control lever 102, to return to the neutral position in response to a lack of pressure applied to the control lever 102.

In various embodiments, the recline lock 200 may be coupled to a spring and thus be spring loaded. In that regard, the recline lock 200 may become spring-loaded in response to rotation of the control lever 102 in the counterclockwise direction and may cause the control lever 102 (via the bell crank 106 and the rotary component) to return to the neutral position in response to a lack of force being applied to the control lever 102. In such embodiments, it may be undesirable to have the spring 114 apply pressure to the rotary component 104 in response to rotation of the rotary component in the counterclockwise direction.

Figure 4B:
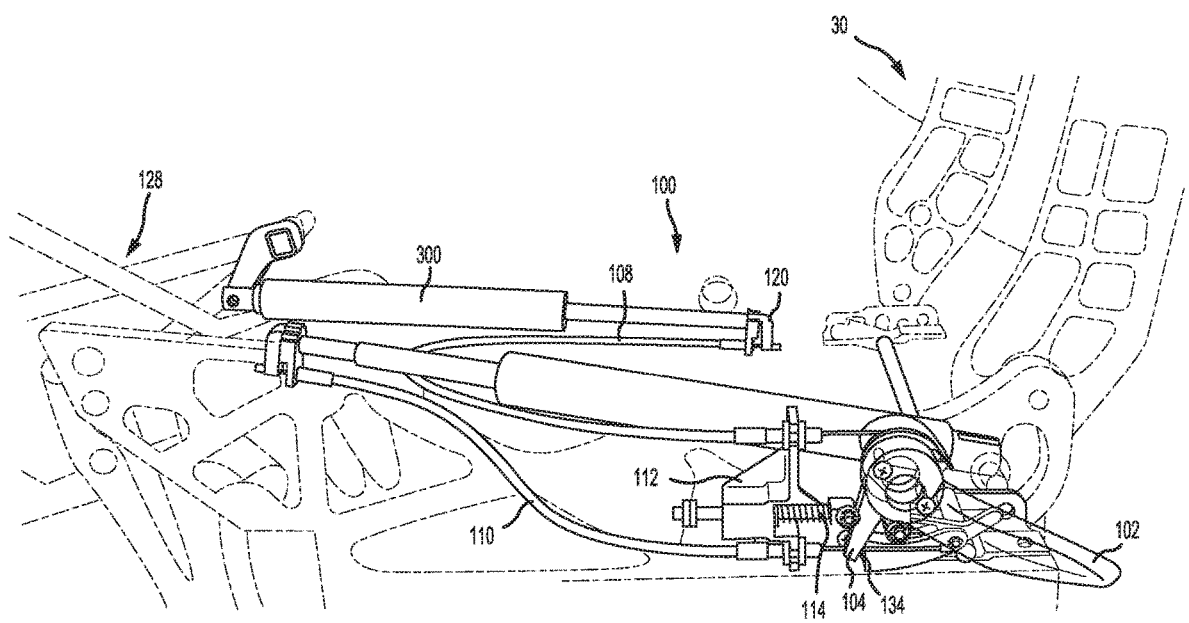

Referring now to FIGS. 4A and 4B, operation of the system 100 to control the second actuated system 126 corresponding to operation of the leg rest 128 is shown. In response to a rotation of the control lever 102 in the clockwise direction, the rotary component 104 may likewise rotate along with the control lever 102. The bell crank 106 may rotate in the counterclockwise direction in response to the clockwise rotation of the rotary component 104. Such rotation of the bell crank 106 in the counterclockwise direction may fail to affect operation of the seat assembly 30.

In response to the rotation of the rotary component 104 in the clockwise direction, the rotary component 104 may apply tension to the first cable 108. This tension may transfer through the first cable 108 and actuate the second controlled component 120, which may correspond to actuation of the fluid cylinder 300. For example, the first cable 108 may actuate a lever or other mechanism that allows the fluid cylinder 300 to receive fluid (to expand) or expel fluid (to contract). Actuation of the fluid cylinder 300 may facilitate movement of the leg rest 128. Thus, rotation of the control lever 102 in the clockwise direction actuates the fluid cylinder 300, allowing the leg rest 128 to actuate.

Due to the second lost motion slot 134 allowing the second cable 110 to move therethrough, rotation of the control lever 102 in the clockwise direction fails to affect the first actuated system 124.

In various embodiments, the spring 114 may be coupled to the rotary component 104 in such a manner that rotation of the rotary component 104 in the clockwise direction compresses the spring 114, thus causing the spring 114 to apply a pressure to the rotary component 104. This pressure may cause the rotary component 104, and thus the control lever 102, to return to the neutral position in response to a lack of pressure applied to the control lever 102.

Although the system 100 has been described as controlling a seat back and a leg rest of a seat assembly, the system 100 may similarly be used to control any two or more actuated systems. For example, the control lever 102 may be used to control a seat height adjustment and a seat back, a desk raising system and a desk/backward actuation system, or the like.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A multi-function lever actuation system, comprising:
   a control lever having a neutral position and configured to be actuated in a clockwise direction and in a counterclockwise direction;
   a bell crank coupled to the control lever and configured to rotate in an opposite direction from the control lever and to actuate a first controlled component in response to a first rotation of the control lever in a first direction corresponding to the clockwise direction or the counterclockwise direction;
   a first cable coupled to the control lever and configured to actuate a second controlled component in response to a rotation of the control lever in a second direction corresponding to the other of the clockwise direction or the counterclockwise direction; and
   a second cable coupled to the control lever and configured to actuate a third controlled component in response to a second rotation of the control lever in the first direction that is greater than the first rotation.

2. The multi-function lever actuation system of claim 1, wherein the control lever defines a first lost motion slot and the first cable is coupled to the control lever via being received by the first lost motion slot such that the first rotation of the control lever in the first direction fails to actuate the first cable.

3. The multi-function lever actuation system of claim 1, wherein the first controlled component and the third controlled component are both coupled to a first actuated system such that actuation of the first controlled component unlocks the first actuated system and actuation of the third controlled component facilitates actuation of the first actuated system.

4. The multi-function lever actuation system of claim 3, wherein the first actuated system is a seat recline system of a seat assembly such that the second rotation of the control lever in the first direction actuates the seat recline system, and the second controlled component is coupled to a second actuated system that corresponds to a leg rest system of the seat assembly such that the rotation of the control lever in the second direction actuates the leg rest system.

5. The multi-function lever actuation system of claim 1, further comprising a rotary component coupled to the control lever and configured to rotate with the control lever, wherein the second cable is coupled to the control lever via the rotary component.

6. The multi-function lever actuation system of claim 5, wherein the rotary component defines a second lost motion slot and the second cable is coupled to the rotary component via being received by the second lost motion slot such that the rotation of the control lever in the second direction fails to actuate the second cable.

7. The multi-function lever actuation system of claim 5, wherein the rotary component is coupled to the bell crank at a fulcrum such that the bell crank rotates in the opposite direction from the rotary component and the control lever.

8. The multi-function lever actuation system of claim 5, further comprising a static component configured to be in contact with the rotary component in response to the control lever being in the neutral position, and a spring coupled to the static component and configured to resist the rotation of the rotary component in the second direction in order to cause the control lever to return to the neutral position in response to a release of pressure to the control lever.

9. The multi-function lever actuation system of claim 3, wherein:
the first controlled component and the third controlled component are both coupled to a first actuated system such that actuation of the first controlled component unlocks the first actuated system and actuation of the third controlled component facilitates actuation of the first actuated system; and
the second controlled component is coupled to a second actuated system such that actuation of the second controlled component facilitates actuation of the second actuated system.

10. A multi-function lever actuation system, comprising:
a control lever having a neutral position and configured to be actuated in a clockwise direction and in a counterclockwise direction;
a rotary component coupled to the control lever and configured to actuate a first controlled component in response to a first rotation of the control lever in a first direction corresponding to the clockwise direction or the counterclockwise direction; and
a first cable coupled to the control lever and configured to actuate a second controlled component in response to a rotation of the control lever in a second direction corresponding to the other of the clockwise direction or the counterclockwise direction,
wherein the control lever defines a first lost motion slot and the first cable is coupled to the control lever via being received by the first lost motion slot such that the first rotation of the control lever in the first direction fails to actuate the first cable.

11. The multi-function lever actuation system of claim 10, further comprising a second cable coupled to the control lever and configured to actuate a third controlled component in response to a second rotation of the control lever in the first direction that is greater than the first rotation.

12. The multi-function lever actuation system of claim 11, wherein the first controlled component and the third controlled component are both coupled to a first actuated system such that actuation of the first controlled component unlocks the first actuated system and actuation of the third controlled component facilitates actuation of the first actuated system.

13. The multi-function lever actuation system of claim 12, wherein the first actuated system is a seat recline system of a seat assembly such that the second rotation of the control lever in the first direction actuates the seat recline system, and the second controlled component is coupled to a second actuated system that corresponds to a leg rest system of the seat assembly such that the rotation of the control lever in the second direction actuates the leg rest system.

14. The multi-function lever actuation system of claim 11, wherein the second cable is coupled to the control lever via the rotary component.

15. The multi-function lever actuation system of claim 14, wherein the rotary component defines a second lost motion slot and the second cable is coupled to the rotary component via being received by the second lost motion slot such that the rotation of the control lever in the second direction fails to actuate the second cable.

16. The multi-function lever actuation system of claim 10, further comprising a bell crank coupled to the rotary component at a fulcrum such that the bell crank rotates in an opposite direction from the rotary component and the control lever, wherein the rotary component is configured to actuate the first controlled component via the rotation of the bell crank.

17. The multi-function lever actuation system of claim 10, further comprising a static component configured to be in contact with the rotary component in response to the control lever being in the neutral position, and a spring coupled to the static component and configured to resist the rotation of the rotary component in the second direction in order to cause the control lever to return to the neutral position in response to a release of pressure to the control lever.

18. A multi-function lever actuation system, comprising:
a control lever having a neutral position and configured to be actuated in a clockwise direction and in a counterclockwise direction;
a rotary component coupled to the control lever and configured to rotate with the control lever;
a bell crank coupled to the rotary component at a fulcrum and configured to rotate in an opposite direction from the control lever and the rotary component in order to actuate a first controlled component in response to a first rotation of the control lever in a first direction corresponding to the clockwise direction or the counterclockwise direction;
a first cable coupled to the control lever and configured to actuate a second controlled component in response to a rotation of the control lever in a second direction corresponding to the other of the clockwise direction or the counterclockwise direction; and
a second cable coupled to the rotary component and configured to actuate a third controlled component in response to a second rotation of the control lever in the first direction that is greater than the first rotation.

* * * * *